US006495242B1

(12) United States Patent
Tsuchiya et al.

(10) Patent No.: US 6,495,242 B1
(45) Date of Patent: Dec. 17, 2002

(54) INK-JET RECORDING SHEET

(75) Inventors: Masaru Tsuchiya, Hino (JP); Kenzo Kasahara, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/327,124

(22) Filed: Jun. 7, 1999

(30) Foreign Application Priority Data

Jun. 11, 1998 (JP) .......................................... 10-179677

(51) Int. Cl.$^{7}$ ............................ B32B 27/14; B32B 3/00
(52) U.S. Cl. ...................................................... 428/195
(58) Field of Search ............................. 428/195, 304.4, 428/323, 331, 480, 522, 537.5

(56) References Cited

U.S. PATENT DOCUMENTS

| | | | | |
|---|---|---|---|---|
| 5,804,320 A | | 9/1998 | Ohmura et al. | |
| 5,863,648 A | | 1/1999 | Tomioka et al. | |
| 6,037,050 A | * | 3/2000 | Saito et al. | 428/304.4 |
| 6,156,419 A | * | 12/2000 | Brugger et al. | 428/304.4 |
| 6,177,188 B1 | * | 1/2001 | Ichioka et al. | 428/342 |
| 6,197,381 B1 | * | 3/2001 | Saito et al. | 427/374.3 |
| 6,200,738 B1 | * | 3/2001 | Takano et al. | 430/362 |

FOREIGN PATENT DOCUMENTS

| | | |
|---|---|---|
| JP | 52-53012 | 4/1977 |
| JP | 55-5830 | 1/1980 |
| JP | 56-157 | 1/1981 |
| JP | 57-14091 | 1/1982 |
| JP | 57-107878 | 7/1982 |
| JP | 58-110287 | 6/1983 |
| JP | 59-68292 | 4/1984 |
| JP | 59-123696 | 7/1984 |
| JP | 60-18383 | 1/1985 |
| JP | 60-210984 | 10/1985 |
| JP | 60-219083 | 11/1985 |
| JP | 61-20797 | 1/1986 |
| JP | 61-135786 | 6/1986 |
| JP | 61-148092 | 7/1986 |
| JP | 61-188183 | 8/1986 |
| JP | 62-111782 | 5/1987 |
| JP | 62-149475 | 7/1987 |
| JP | 63-252779 | 10/1988 |
| JP | 1-108083 | 4/1989 |
| JP | 2-136279 | 5/1990 |
| JP | 2-276671 | 11/1990 |
| JP | 3-27976 | 2/1991 |
| JP | 3-65376 | 3/1991 |
| JP | 3-67684 | 3/1991 |
| JP | 3-215082 | 9/1991 |
| JP | 3-251488 | 11/1991 |
| JP | 4-67986 | 3/1992 |
| JP | 4-263983 | 9/1992 |
| JP | 5-16517 | 1/1993 |
| JP | 5-278324 | 10/1993 |
| JP | 6-92011 | 4/1994 |
| JP | 06-183131 | 7/1994 |
| JP | 6-183134 | 7/1994 |
| JP | 7-137431 | 5/1995 |
| JP | 7-276789 | 10/1995 |

OTHER PUBLICATIONS

Japanese Industrial Standard, JIS Z 8741 (1997), pp. 1–11 "Specular glossiness—Methods of Measurement."

* cited by examiner

*Primary Examiner*—Bruce H. Hess
*Assistant Examiner*—B. Shewareged
(74) *Attorney, Agent, or Firm*—Frishauf, Holtz, Goodman & Chick, P.C.

(57) ABSTRACT

An ink-jet recording sheet comprising a support and an ink-absorbable layer is disclosed. The ink-absorbable layer is a void layer containing fine inorganic particles having a dispersion degree of no more than 2 and a hydrophilic binder. The ink-jet recording sheet has a specular gloss specified by JIS Z8741, of at least 20 percent at 60 degrees of the surface of said ink absorbable layer, and exhibits the specular gloss such that 60-degree specular gloss of an ink-recorded part is 3 percent more than that of a nonink-recorded part.

22 Claims, No Drawings

INK-JET RECORDING SHEET

FIELD OF THE INVENTION

The present invention relates to an ink-jet recording sheet, and specifically to an ink-jet recording sheet which results in high quality prints.

BACKGROUND OF THE INVENTION

Ink-jet recording is carried out by impinging micro-droplets employing various working principles and attaching them onto a recording sheet of paper to record images, letters and the like, and exhibits advantages such as relatively high speed, low noise, easy application for multicolor. At present, it has been increasingly employed in various fields such as printers, facsimile machines, computer terminals and the like.

Requirements for a recording sheet employed in such ink-jet recording system is that the density of printed dots is high, color tone is bright and clear, ink is rapidly absorbed and when printed dots are superimposed, ink should neither run nor blot, the diffusion of a printed dot in the lateral direction should not be greater than needed, and the circumference should be smooth and result in no blurring; and the like.

Specifically, at low rates of ink absorption, when recording is carried out by superimposing at least two color ink droplets, on a recording sheet, droplets result in repellence to cause unevenness, and in the boundary area of different colors, different color inks blot with each other. As a result, image quality tends to be markedly degraded. Therefore, it is required that the recording sheet exhibits high ink absorbability.

In order to solve these problems, conventionally, a great number of techniques have been proposed.

For example, Japanese Patent Publication Open to Public Inspection No. 52-53012 describes a recording sheet in which minimally sized paper is damped with paint employed for surface treatment; Japanese Patent Publication Open to Public Inspection No. 55-5830 describes a recording sheet comprising a support in which an ink-absorbable coating layer is provided on the surface of the support; Japanese Patent Publication Open to Public Inspection No. 56-157 describes a recording sheet comprising a covering layer containing non-colloidal silica powder as a pigment; Japanese Patent Publication Open to Public Inspection No. 57-107873 describes a recording sheet comprising an inorganic pigment and an organic pigment in combination; Japanese Patent Publication Open to Public Inspection No. 58-110287 describes a recording sheet which exhibits a void distribution with two peaks; Japanese Patent Publication Open to Public Inspection No. 62-111782 describes a recording sheet composed of an upper porous layer and a lower porous layer; Japanese Patent Publication Open to Public Inspection Nos. 59-68292, 59-123696, 60-18383, etc. describe a recording sheet having amorphous cracking; Japanese Patent Publication Open to Public Inspection Nos. 61-135786, etc. describe a recording sheet having a fine powder layer; Japanese Patent Publication Open to Public Inspection Nos. 63-252779, 1-108083, 2-136279, 3-65376, 3-27976, etc. describe a recording sheet comprising pigments and fine silica particles having specified physical parameters; Japanese Patent Publication Open to Public Inspection Nos. 57-14091, 60-219083, 60-210984, 61-20797, 61-188183, 5-278324, 6-92011, 6-183134, 7-137431, 7-276789, etc. describe a recording sheet containing fine silica particles such as colloidal silica; Japanese Patent Publication Open to Public Inspection Nos. 2-276671, 3-67684, 3-215082, 3-251488, 4-67986, 4-263983, 5-16517, etc. describe a recording sheet containing fine hydrated alumina particles, and the like.

Of these, because relatively high gloss is obtained, as high quality glossy sheets, void type recording sheets are preferred in which fine voids are formed in the ink receptive layer employing fine inorganic particles and a hydrophilic binder.

When a recording sheet has excessively high gloss, it is found that when a plurality of sheets are fed from a stack, two or more sheets tend to be fed at the same time due to the excessive surface friction, or after ink-jet recording, the gloss of an image area formed by receiving inks tends to decrease.

Hereinafter, a part which has received ink will be denoted an image area, while a part which has not received ink will be denoted a non-image area.

Specifically, regarding the latter, in conventional recording sheets having high gloss, as the gloss of the non-image part, which has not received ink, increases, the print quality tends to be markedly degraded due to a minor decrease in the gloss of the image part. Consequently, in terms of the print quality, only the improvement in the gloss of the non-image part is not sufficient for that as print quality.

In the image quality of conventional ink-jet recording, regarding this point, as major factors, granular appearance and resolution have been areas of concern and even this point has not been of much concern. However, in recent years, due to the emergence of high quality printers, the print image quality has markedly improved and is approaching the level of photographic prints. Thus, the importance of this aspect has increased.

The reason for a decrease in the gloss of an image part decreases is not clarified as yet. However, it is assumed that the decrease is caused by swelling the hydrophilic binder in an ink receptive layer using low-volatile solvents contained in the ink-jet recording ink.

In conventional recording sheets, from such a viewpoint, an approach to improve the print quality has not been carried out. Inventors of the present invention have diligently investigated this point, and as a result, it is revealed that prints with highly excellent image quality are obtained by enhancing the glossiness of the image parts more than the nonimage parts, while specifying the glossiness of the surface to a specific range.

SUMMARY OF THE INVENTION

An object of the present invention is to provide an ink-jet recording sheet which has relatively high gloss and results in a high quality print due to a further increase in the gloss when printed by employing an ink-jet method.

Ink-jet recording sheets and embodiments thereof will be described below.

In ink-jet recording sheets comprising a support having thereon a void layer containing fine inorganic particles having a dispersion degree of no more than 2 and a hydrophilic binder as an ink-absorbable layer, having a specular gloss, specified by JIS Z8741, of at least 20 percent at 60 degrees of the surface of said ink absorbable layer, and exhibiting the specular gloss such that 60-degree specular gloss of an ink-recorded part is 3 percent more than that of a nonink-recorded part.

A support is preferably water-resistant.

Fine inorganic particles are preferably silica having an average particle diameter of no more than 100 nm and a hydrophilic binder is preferably polyvinyl alcohol.

A hardener may be incorporated into the void layer.

Examples of hardeners are boric acids or salts thereof.

The support is preferably a water-resistant support having a specular gloss of 20 to 80 percent.

DETAILED DESCRIPTION OF THE INVENTION

The present invention will now be detailed.

Employed as supports used for ink-jet recording sheets may be water-absorbable supports such as paper, plastic resin film, paper supports laminated with plastic resin film on their surfaces, etc. water-resistant supports are preferred because an area which has received ink through ink-jet tends not to wrinkle, and preferred properties are obtained without degrading the print quality.

Employed as preferred water-resistant supports can be, for example, transparent films composed of materials such as polyester series film, diacetate series film, triacetate series film, acrylic series film, polycarbonate series film, polyvinyl chloride series film, polyimide series film, cellophane, celluloid, etc., resin coated paper (generally denoted as RC paper) having a polyolefin resin-laminated layer on at least one surface of the substrate paper, and translucent or opaque supports such as so-called White Pet etc. which are prepared by adding white pigments such as titanium dioxide, barium sulfate, etc. into polyethylene terephthalate film. The opaque supports markedly exhibit effects of the present invention when reflection images on prints are observed.

Supports which are most preferably employed include translucent polyester film, opaque polyolefin resin film and paper supports, laminated with polyethylene on both surfaces of a paper substrate.

The paper supports which are laminated with polyethylene are particularly preferred. Supports described below exhibit relatively high glossiness and are preferred to provide ink-jet recording sheets which form high quality prints due to a further increase in glossiness.

The glossiness of the ink-absorbable layer surface of the above-mentioned supports is preferably at least 20 percent in terms of its 60-degree specular gloss, and is most preferably between 20 and 60 percent.

Paper employed for a paper support is produced employing wood pulp as a main raw material, and in addition, synthetic pulp such as polypropylene, etc. or synthetic fiber such as nylon, polyester, etc., if required. As the wood pulp, any of LBKP, LBSP, NBKP, NBSP, LDP, NDP, LUKP, and NUKP can be employed. However, LBKP, NBSP, LBSP, NDP, and LDP having a shorter fiber portion are preferably employed in a larger ratio. However, a content ratio of LBSP and/or LDP is preferably between 10 and 70 weight percent.

As the above-mentioned pulp, chemical pulp (sulfate salt pulp or sulfite pulp) containing minimum impurities is preferably employed, and pulp which is subjected to bleaching treatment to increase whiteness is also beneficial.

Into the paper, can appropriately be added higher fatty acids, sizing agents such as alkylketene dimer, etc., white pigments such as calcium carbonate, talc, titanium oxide, etc., paper strengthening agents such as starch, polyacrylamide, polyvinyl alcohol, etc., fluorescent whitening agents, moisture maintaining agents such as polyethylene glycol, etc., dispersing agents, softening agents such as quaternary ammonium, etc.

The degree of water freeness of pulp employed for paper-making is preferably between 200 and 500 cc according to CSF specification. Furthermore, the sum of weight percent of 24-mesh residue and weight percent of 42-mesh calculated portion regarding the fiber length after beating, specified in JIS-P-8207 is preferably between 30 and 70 percent. Further, the weight percent of 4-mesh residue is preferably not more than 20 weight percent.

The weight of the paper is preferably between 30 and 250 $g/m^2$, and is most preferably between 50 and 200 $g/m^2$. The thickness of the paper is preferably between 40 and 250 $\mu$m.

The paper is calendered, during or after paper-making process, to result in enhanced smoothness. The density of the paper is generally between 0.7 and 1.2 $g/m^2$ (JIS-P-8118). Furthermore, the rigidity of the base paper is preferably between 20 and 200 g under conditions specified in JIS-P-8143.

A surface sizing agent may be coated onto the surface of the paper. As surface sizing agents, the same as those described above which can be incorporated into the paper can be employed.

The pH of the paper, when measured employing a hot water extraction method specified in JIS-P-8113, is preferably between 5 and 9.

As polyethylene which covers both surfaces of the paper, low density polyethylene (LDPE) and/or high density polyethylene (HDPE) is mainly employed. However, other than these, LLDPE, polypropylene, etc. can be partially employed.

Specifically, a polyethylene layer on the surface of an ink receptive layer is preferably one in which, as carried out in photographic paper, rutile- or anatase-type titanium oxide is incorporated into polyethylene, and opacity as well as whiteness are improved. The content of titanium oxide is generally between 3 and 20 percent by weight of polyethylene, and is preferably between 4 and 13 percent by weight.

Polyethylene coated paper can be employed as glossy paper. Furthermore, in the present invention, polyethylene coated paper having a matte or silk surface can also be employed, which is prepared by embossing when polyethylene is melt-extrude-coated onto the surface of the paper.

The employed amount of polyethylene on both surfaces of the paper is determined so that after providing an ink receptive layer and a backing layer, tendency to curl is minimized under low and high humidity. Generally, the thickness of the polyethylene layer on the ink receptive layer side is in the range of 20 to 40 $\mu$m and that of the backing layer side is in the range of 10 to 30 $\mu$m.

Furthermore, the above-mentioned polyethylene coated paper support having the following characteristics is preferably employed:

1. tensile strength: being strength specified in JIS-P-8113, 2 to 30 kg in the longitudinal direction, and 1 to 20 kg in the lateral direction
2. tear strength: to be 10 to 200 g in the longitudinal direction and 20 to 200 g in the lateral direction in accordance with the method specified in JIS-P-8116
3. compression elastic modulus: 103 $kgf/cm^2$ or more
4. Beck surface smoothness: preferably not less than 20-second light for a gloss surface under conditions specified in JIS-P-8119, and for embossed paper support, acceptable for less than this value
5. opacity: not less than 22%, and preferably not less than 15% when measured by a condition of ratio of linear incident light to diffuse transmission of visible ray.

The specular gloss at 60 degrees of the surface of the ink absorbable layer is at least 20 percent and preferably 20–60 percent.

The recording sheet of the present invention has a void layer comprising fine inorganic particles having an average particle diameter of no more than 100 nm, as well as a dispersion degree of no more than 2, as an ink-absorbable layer.

Listed as examples of fine inorganic particles employed in the ink-absorbable layer can be white inorganic pigments such as soft calcium carbonate, heavy calcium carbonate, magnesium carbonate, kaolin, clay, talc, calcium sulfate, barium sulfate, titanium dioxide, zinc chloride, zinc hydroxide, zinc sulfide, zinc carbonate, hydrotalcite, aluminum silicate, diatomaceous earth, calcium silicate, magnesium silicate, synthesized amorphous silica, colloidal silica, alumina, colloidal alumina, pseudoboehmite, aluminum hydroxide, lithopone, zeolite, magnesium hydroxide, etc.

Such fine inorganic particles may be employed in the form of primary particles as they are, and in the form of secondary aggregated particles.

In the present invention, silica or pseudoboehmite is preferred so that fine voids are specifically formed. Particularly, silica with a diameter of no more than 100 nm, synthesized by a gas phase method, colloidal silica, and pseudoboehmite are preferred.

The silica synthesized by a gas phase method is particularly preferred. The average particle diameter of fine inorganic particles is obtained as follows: particle themselves, the cross section of a void layer, or the surface is observed employing an electron microscope and particle diameters of statistic of particles such as randomly selected 100 are measured and the average diameter of fine inorganic particles are obtained as a simple average (a number average). The particle diameter as described herein, is represented by the diameter of an assumed circle which has the same area as the projection area of each grain.

Further, the dispersion degree in the present invention is obtained as follows: as statistic, for example, 100 randomly selected inorganic particles are measured and from the sphere-equivalent particle diameters obtained from a measurement of a particle size distribution, a value is obtained which is represented by a ratio of standard deviation/average particle diameter, which are calculated based on ($\Sigma NV^2/\Sigma NV$).

The average particle diameter of fine inorganic particles is preferably no more than 80 nm and the dispersing degree is preferably no more than 1.8, because fine unevenness of an ink absorptive layer is obtained to readily result in high glossiness.

Hydrophilic binders employed for a void layer may be appropriately selected and employed. For example, listed can be gelatin, polyvinyl alcohol, polyvinyl pyrrolidone, polyethylene oxide, polyacrylic acid, polyacrylamide, agar, carageenan, dextran, dextrin, polyurethane, Pullulan, hydroxyethyl cellulose, carboxymethyl cellulose, etc. These hydrophilic binders may be employed in combination.

A particularly preferred hydrophilic binder is polyvinyl alcohol. In addition to ordinary polyvinyl alcohol prepared by hydrolyzing polyvinyl acetate, polyvinyl alcohols which are preferably employed in the present invention, include modified polyvinyl alcohols such as polyvinyl alcohol subjected to cation modification at the terminal, anion-modified polyvinyl alcohol having an anionic group, etc.

The anion-modified polyvinyl alcohol includes, for example, polyvinyl alcohol having an anionic group such as described in Japanese Patent Publication Open to Public Inspection No. 1-206088, copolymers of vinyl alcohol with a vinyl compound having a water-soluble group as described in Japanese Patent Publication Open to Public Inspection No. 63–307979, and modified polyvinyl alcohol having a water-soluble group as described in Japanese Patent Publication Open to Public Inspection No. 7-285265.

Further, the nonion-modified polyvinyl alcohol includes, for example, polyvinyl derivatives in which a polyalkylene oxide group is added to a part of the polyvinyl alcohol as described in Japanese Patent Publication Open to Public Inspection No. 7-9758, and block copolymers of a vinyl compound having a hydrophobic group with vinyl alcohol described in Japanese Patent Publication Open to Public Inspection No. 8-25795.

Polyvinyl alcohols may be employed in combination of at least two of these which are different in the degree of polymerization, modified types, etc.

The employed amount of the previously cited fine inorganic particles is preferably between 3 and 50 g per $m^2$ of the recording sheet, and is more preferably between 5 and 30 g per $m^2$. Furthermore, the employed amount of the hydrophilic binder is preferably between 0.5 and 10 g per $m^2$ of the recording sheet, and is more preferably between 1 and 5 g per $m^2$. Further, the ratio of the fine inorganic particles to the hydrophilic binder is generally between 3 and 10 in terms of weight ratio, and is preferably between 4 and 8.

The 60-degree secular gloss of the surface of the ink-absorbable layer of an ink-jet recording sheet, when receiving no ink, is at least 20 percent, and the gloss of the image area which has received ink after printing employing ink-jet is at least 3 percent higher than the unrecorded area (which has not received ink).

When the gloss of a nonimage area is at least 20 percent, high-quality texture is obtained even though the gloss of the image area is higher than that of the nonimage area.

The gloss of the nonimage area is not particularly limited from the viewpoint obtaining the effects of the present invention, however, it is generally below 70 percent.

Furthermore, the gloss of the image area is required to be at least 3 percent higher than that of the nonimage area, and is preferably required to be at least 3 percent. The gloss of the image area is preferably no more than 15 percent higher than that of the image area. In order to obtain finished prints having natural appearance so that the balance of the image area to the nonimage area is appropriate, it is preferred not to exceed 20 percent. In order to obtain those having a more natural appearance, it is preferred not to exceed 15 percent.

The gloss of the image area as described herein is a value obtained as follows: printing is carried out employing an ink-jet printer under conditions to obtain the maximum black density, and measurement is carried out after leaving the resulting printing for 1 hour in the range of 20 to 25° C. and RH 40 to 60%.

In order to obtain ink-jet recording sheets having a gloss of at least 20 percent, in addition to the method in which the particle diameter of fine inorganic particles is adjusted to no more than 100 nm, any method may be employed in combination, in which the content of coarse particles in the coating composition of an ink-absorbable layer which is coated onto a support is decreased as much as possible, or after coating, the coated surface is brought into pressure contact with a heated mirror-surfaced roller before the coated layer is completely dried so that the gloss is controlled.

A method to increase the gloss of the image area more than that of the nonimage area will now be described.

The method to increase the gloss of the image area higher than that of the nonimage area is illustrated.

(a) an ink-absorbable layer is composed of at least two void layers, and in at least one void layer, except for the uppermost void layer, organic compound particles having a relatively particle diameter are added, and to the void layer farthest from the support (the uppermost void layer), such particles are not at all added or are somewhat added, and such particle distribution is formed among layers.

The organic compound particles employed in this case are those obtained by emulsifying-dispersing a hydrophobic organic compound or latex polymer particles, etc.

These particles may have a grain diameter distribution in which grain diameters are relatively uniform or may have a broad particle-diameter distribution. Generally, however, a particle diameter component of approximately 0.1 to 5 μm is important to obtain the effects of the present invention.

Accordingly, when particles having a relatively uniform particle-diameter distribution are employed, particles generally having an average particle diameter of approximately 0.5 to 5 μm are preferably employed.

On the other hand, in the case of a broad particle-diameter distribution, particles having an average particle diameter of 0.2 to 1 μm are preferably employed.

The added ratio of the above cited organic compound particles to the hydrophilic binder comprising them is generally between 10 and 50 weight percent.

(b) an ink-absorbable layer is composed so as to have at least two void layers, and fine particles having a higher refractive index than that of fine inorganic particles which are used to form voids, are employed in at least one void layer, except for the uppermost layer.

Listed as fine particles having such a high refractive index, are, for example, titanium oxide, zinc oxide, barium sulfate, etc.

Non of these fine inorganic particles having a high refractive index are preferably added to the uppermost void layer relative to the support because neither a decrease in density obtained by color development nor a decrease in the gloss of image area, occurs.

The average particle diameter of the above cited fine inorganic particles having a high refractive index is preferably no more than 1 μm, and is most preferably no more than 0.5 μm. The lowest limit of the average particle diameter is generally at least 0.1 μm.

The added amount of the above cited fine inorganic particles having a high refractive index is generally between 1 and 20 weight percent with respect to fine inorganic particles contained in the void layer comprising the same.

(c) an ink-absorbable layer is composed so as to have at least two void layers, and the ratio of fine inorganic particles in at least one void layer except for the uppermost lay, or preferably by two, more than that in the uppermost layer.

Namely, gloss after printing can be enhanced by increasing the ratio of a hydrophilic binder to fine inorganic particles in at least one layer except for the uppermost layer. Such a layer having the high ratio of fine inorganic particles is preferably a layer adjacent to the uppermost layer.

(d) a method is that each void layer is formed employing fine inorganic particles so as to have different average particle diameter. Fine inorganic particles having a different average particle diameter by preferably at least 2 μm or more preferably 5 μm from others are employed individually in different layers. In this case, it is preferred that a void layer formed by employing fine inorganic particles having a larger particle diameter is preferably arranged nearer the side of the support because a decrease in maximum density is small. The average diameter of fine inorganic particles in the uppermost layer is preferably smallest in a plurality of void layers.

(e) a void layer which is formed employing a coating composition, which forms weakly structured coagulum upon mixing with another coating composition, is arranged so as to be an adjacent layer.

There are several pairs of coating compositions which forms such coagula upon mixing with each other. For example, there are various methods in which a simultaneous multilayer coating is carried out employing two coating compositions which have a pH different from each other, are stabilized at each pH, and result in coagulation in at least one of the coating composition due to the variation of pH upon mixing; a simultaneous multilayer coating is carried out employing two coating compositions which are subjected to rapid variation of the pH when mixed with each other; and further, a simultaneous multilayer coating is carried out employing two coating compositions in which one is a cationic composition and the other is an anionic composition; and the like.

(f) an ink-absorbable layer comprised substantially of a swelling layer is provided on a support, and the void layer of the present invention is provided thereon. The swelling layer as described herein is a layer in which its layer thickness increases due to the function of swelling upon absorbing ink and water, and is mainly comprised of a hydrophilic binder. The swelling layer may contain inorganic pigments, and the employed amount is no more than 3 times and preferably no more than 2 times as much as the hydrophilic binder in terms of weight. This hydrophilic binder may be the same or different from that composing the void layer. Hydrophilic binders preferably employed in the swelling layer include gelatin, polyvinyl alcohol, polyvinyl pyrrolidone, polyethylene oxide and mixtures thereof. Specifically, one of the mixture is preferably gelatin.

The hydrophilic binder contained in the swelling layer is preferably hardened by a hardener which can crosslink with the hydrophilic binder so that no cracking results when a void layer is applied. The amount of the hydrophilic binder employed in the swelling layer is generally between 0.1 and 3 g per $m^2$ of the recording sheet.

The swelling layer and the void layer may be simultaneously coated or after the swelling layer is coated and is subsequently dried, the void layer may be applied. However, the latter is preferred due to reduced formation of cracking.

In the present invention, the previously listed methods to increase the gloss of an image area more than that of a nonimage area may be individually applied or may be applied in combination.

The void layer of the present invention may comprise a hardener. When the layer is hardened, it is occasionally convenient to increase the gloss of the image area which has received ink.

Hardeners are compounds which crosslink with a binder composing a void layer. When the hydrophilic binder is polyvinyl alcohol, which is most preferably employed, as hardeners, boric acids and salts thereof are preferred. Boric acids and salts thereof include oxygen acids having a boron atom as a center atom and salts thereof, and specifically, orthoboric acid, metaboric acid, hypoboric acid, tetraboric acid, pentaboric acid and salts thereof.

The employed amount of boric acids or salts thereof varies widely depending on the amount of fine inorganic particles and hydrophilic binders in the coating composition, however, it is generally between 1 and 60 weight percent of the hydrophilic binder, and is preferably between 5 and 40 weight percent.

In addition to the above listed additives, various additives may be incorporated into the void layer of ink-jet recording sheets.

Of these, a cationic mordant is preferred to improve the water resistance and moisture resistance after printing.

Employed as cationic mordants are polymer mordants having a primary, secondary or tertiary amino group and a quaternary ammonium salt group. Of these, polymer mordants having the quaternary ammonium salt group are preferred because discoloration due to aging and degradation of light fastness are minimal, and mordant capability is sufficiently high.

Preferred polymer mordants are obtained as homopolymers of monomers having the above cited quaternary ammonium salt group, copolymers or condensation polymers with other monomers.

Incorporated as additives other than those described above, can be UV absorbers described in Japanese Patent Publication Open to Public Inspection Nos. 57-74193, 57-87988, and 62-261476; anti-discoloring agents described in Japanese Patent Publication Open to Public Inspection Nos. 57-74192, 57-87989, 60-72785, 61-146591, 1-95091, and 3-13376; various types of anionic, cationic and nonionic surface active agents; fluorescent whitening agents described in Japanese Patent Publication Open to Public Inspection Nos. 59-42993, 59-52689, 62-280069, 61-242871, and 4-219266; and also various types of additives known in the art such as antifoaming agents, lubricants such as diethylene glycol, etc., antiseptics, thickeners, antistatic agents, matting agents, etc.

In order to improve lubricating properties, silicone oil, fluorine series surface active agents and organic or inorganic matting agents having an average particle diameter of 5 to 30 $\mu$m are particularly added to the uppermost layer, in a range in which the effects of the present invention are not adversely affected.

When a plurality of void layers are applied onto a support, preferably, all void layers are simultaneously coated.

Employed as the preferred coating methods are a roll coating method, a rod bar coating method, an air knife coating method, a spray coating method, a curtain coating method, or an extrusion coating method employing a hopper, as described in U.S. Pat. No. 2,681,294.

On an aqueous composition-coated side and its reverse side, various types of backing layers are preferably provided in order to minimize curling, sticking which is caused upon being piled up immediately after printing, and ink transfer.

The constitution varies depending on the type of support, its thickness, the constitution of a surface side and its thickness, however, generally, a hydrophilic binder or a hydrophobic binder is employed. The thickness of the backing layer is generally in the range of 0.1 to 10 $\mu$m.

Furthermore, the surface of the backing layer can be roughened or matted in order to minimize sticking with other recording sheets, which also improves writability, and further, to improve conveyance properties in an ink-jet recording apparatus. For this purpose, fine organic or inorganic particles having a particle diameter of 2 to 20 $\mu$m are preferably employed.

Such backing layers may be provided in advance and may be provided after applying the coating an ink receiving layer.

Ink which is employed for ink-jet recording employing ink-jet recording sheets will now be described below.

This ink is a water-based recording liquid, and is a recording liquid commonly composed of water-soluble dyes, liquid media, and other additives. Employed as water-soluble dyes may be direct dyes, acidic dyes, basic dyes, reactive dyes, food dyes, etc., which are employed for ink-jet but direct dyes or acidic dyes are preferred.

As solvents in the recording liquid, water is a major portion. However, in order to prevent clogging at the end of a nozzle or in the feeding path of recording liquid, high boiling point organic solvents are employed which generally have a boiling point of at least 120° C. and is liquid at room temperature. High boiling point organic solvents are required to have a vapor pressure much lower than water so that it should exhibit a function to minimize the formation of coarse deposits which are formed by depositing of solid components such as dyes when water is removed through evaporation, while it is also required to have high miscibility with water.

For such a purpose, as high boiling point organic solvents, many organic solvents having a high boiling point are generally employed and specific examples include alcohols such as ethylene glycol, propylene glycol, diethylene glycol, triethylene glycol, glycerin, diethylene glycol monomethyl ether, diethylene glycol monobutyl ether, triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, polyethylene glycol (having an average molecular weight of no more than about 300), etc. In addition to the above listed compounds, dimethylformamide, N-methylpyrrolidone, etc. can be employed.

Of a number of these high boiling point organic solvents, those are preferred which are polyhydric alcohols such as diethylene glycol, triethanolamine, glycerin, triethanolamine, etc. and lower alkyl ethers of polyhydric alcohols such as triethylene glycol monobutyl ether, etc. The employed amount of these high boiling point organic solvents is between 10 and 50 weight percent of the ink, and is preferably between 15 and 40 weight percent.

Listed as other additives incorporated into the recording liquid are, for example, pH regulators, sequestering agents, antiseptics, viscosity controlling agents, surface tension controlling agents, wetting agents, surface active agents, rust-inhibitors, etc.

In order to improve the wettability of the recording liquid to a recording sheet and to stabilize the ejection from an ink-jet nozzle, the surface tension at 25° C. is between 25 and 50 dyne/cm, and is preferably between 28 and 40 dyne/cm.

Further, the viscosity of the recording liquid at 25° C. is generally between 2 and 10 cp, and is preferably 2.5 and 8 cp. The pH of the recording liquid is preferably between 3 and 9.

When an ink droplet having a volume of $1\times10^{-3}$ to $30\times10^{-3}$ nl as a minimum droplet is ejected from an ink nozzle, it is preferred to obtain a minimum dot diameter of about 20 to 60 $\mu$m on a recording sheet. A color print printed employing such a dot diameter provides a high-quality image. A preferred case is when a droplet having a volume of $2\times10^{-3}$ to $20\times10^{-3}$ nl is ejected as a minimum droplet.

Furthermore, a method in which for at least magenta and cyan, recording is carried out employing two types of inks having at least two times difference in each density is also applied to ink-jet recording sheets.

Ink-jet recording methods are detailed, for example, in "Ink-jet Kirokugijutsu no Doko (Technical Trend of Ink-jet Recording)" (Koichi Nakamura, Editor, Mar. 31, 1995, published by Nihon Kagaku Joho Co.) and this publication may be used as the reference.

EXAMPLE

The present invention is explained with reference to examples below. "%" in examples represents absolute dry weight percent, unless otherwise specified.

Comparative Example 1

Added 450 liters of 18 percent aqueous dispersion A1 (having a pH of 2.6 and containing 1 weight percent of ethanol), in which gas phase method silica (A300, manufactured by Nihon Earojiru Kogyo Co.) with an average primary particle diameter of approximately 0.007 μm had been previously and uniformly dispersed, were while stirring at room temperature to 100 liters of an aqueous solution C1 (having a pH of 2.3 and containing 2 g of antifoaming agent SN381, manufactured by Sannobuko Co.) containing 18 weight percent of cationic polymer P-1 described below and 1 weight percent of ethanol.

Next, 47 liters of aqueous mixed solution, D Solution (having a concentration of 3 percent, respectively) having a boric acid and borax weight ratio of 1:1 were gradually added while stirring.

Next, the resulting mixture was subjected to dispersion at a pressure of 500 $Kg/cm^2$ employing a high pressure homogenizer manufactured by Sanwa Kogyo Co. and the total volume of the resulting dispersion was adjusted to 630 liters using deionized water.

The resulting dispersion was filtered employing filter TCP-10 Type having a filtering accuracy of 30 μm manufactured by Advantex Toyo Co., and nearly transparent Dispersion B1 was obtained.

P-1

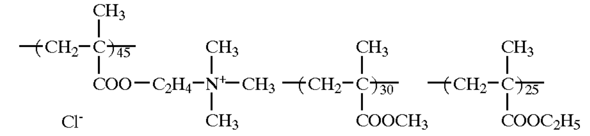

Employing the above-mentioned dispersion, 4 types of coating compositions described below were prepared for coating of an ink-jet recording sheet composed of four layers (each value represents an amount per liter of the coating composition and the addition was carried out in the order of the described order).

| | |
|---|---|
| First Layer Coating Composition | |
| Silica Dispersion B1 | 520 ml |
| Polyvinyl alcohol (PVA203, manufactured by Kuraray Co.) 10% aqueous solution | 10 ml |
| Polyvinyl alcohol (PVA235, manufactured by Kuraray Co.) 5% aqueous solution | 250 ml |
| Fluorescent whitening agent dispersion (described below) | 30 ml |
| Ethanol | 8.5 ml |
| Deionized water to make | 1000 ml |
| Second Layer Coating Composition | |
| Dispersion B1 | |
| Silica dispersion B1 | 600 ml |
| Polyvinyl alcohol (PVA203, manufactured by Kuraray Co.) 10% aqueous solution | 10 ml |
| Polyvinyl alcohol (PVA235, manufactured by Kuraray Co.) 5% aqueous solution | 260 ml |
| Fluorescent whitening agent dispersion (described below) | 30 ml |
| Ethanol | 3.5 ml |
| Deionized water to make | 1000 ml |
| Third Layer Coating Composition | |
| Dispersion B1 | |
| Silica dispersion B1 | 620 ml |
| Polyvinyl alcohol (PVA203, manufactured by Kuraray Co.) 10% aqueous solution | 10 ml |
| Polyvinyl alcohol (PVA235, manufactured by Kuraray Co.) 5% aqueous solution | 265 ml |
| Fluorescent whitening agent dispersion (described below) | 10 ml |
| Ethanol | 10 ml |
| Deionized water to make | 1000 ml |
| Fourth Layer (Uppermost Layer) Coating Composition | |
| Dispersion B1 | |
| Silica dispersion B1 | 590 ml |
| Polyvinyl alcohol (PVA203, manufactured by Kuraray Co.) 10% aqueous solution | 5 ml |
| Polyvinyl alcohol (PVA235, manufactured by Kuraray Co.) 5% aqueous solution | 240 ml |
| Aqueous saponin solution (20%) | 10 ml |
| Matting agent dispersion containing 10 weight percent of methyl methacrylate having an average particle diameter of 5 μm and a dispersion degree of 0.5 | 4 ml |
| Ethanol | 11 ml |
| Deionized water to make | 1000 ml |

Fluorescent Whitening Agent Dispersion: added a solution prepared by dissolving 600 g of an oil-soluble fluorescent whitening agent (UVITEX-OB) manufactured by Ciba-Geigy Co. and 12 Kg of diisodecyl phthalate in 25 liters of ethyl acetate upon heating was to 100 liters of a 3 percent aqueous acid-treated gelatin solution (comprising 4 Kg of saponin and 2 Kg of cationic polymer P-1), and the resulting mixture was subjected to emulsifying dispersion employing a high pressure homogenizer. The total volume of the resulting dispersion was adjusted to 140 liters using deionized water. The particle diameter distribution of the dispersed particles in the dispersion was measured by employing a Coulter counter. As a result, it was found that the average particle diameter was 0.34 μm and the ratio of particles having a particle diameter of at least 1 μm was no more than 0.1 percent.

Onto a paper support (having a thickness of 240 μm and a 75-degree secular gloss of the coated surface of 30 percent) laminated with polyethylene on both surfaces, four layers were simultaneously coated so as to obtain the wet layer thickness described below to obtain ink-jet Recording Sheet-1.

First layer: 50 μm
Second layer: 50 μm
Third layer: 50 μm
Fourth layer: 50 μm

After simultaneously coating compositions maintained at 40° C., the coating was transported through a cooling zone at 0° C. for 20 seconds and was dried with blown air of 30 to 50° C. over 4 minutes.

A part of the obtained Recording Sheet was observed employing an electron microscope and the total thickness was found to be approximately 40 μm.

Next, Recording Sheet-2 through Recording Sheet-7 were prepared in the same manner as Recording Sheet-1, except that in Dispersion B1 employed for the first to fourth layer of Recording Sheet-1, Dispersions B1 through B7, varied as described below, were prepared in the same manner as Dispersion B1 and employed.

Dispersion B2: same as Dispersion B1 except that the amount of the cationic polymer was decreased to ⅔

Dispersion B3: same as Dispersion B1 except the primary particles were replaced with gas phase method silica (A200, manufactured by Nihon Aerojikaru Co.) having an average particle diameter of 0.012 nm Dispersion B4: same as Dispersion B1 except that the primary particles were replaced with gas phase method silica (A50, manufactured by Nihon Earojiru Co.) having an average particle diameter of 0.03 nm Dispersion B5: same as Dispersion B1 except that silica particles were replaced with a mixture of the gas phase method silica having an average primary particle diameter of 0.007 nm employed in Dispersion B1 and the gas phase method silica having an average primary particle diameter of 0.012 nm employed in Dispersion B3 in a weight ratio of 1:1

Dispersion B6: same as Dispersion B1 except that silica particles were replaced with a mixture of the gas phase method silica having an average primary particle diameter of 0.007 nm employed in Dispersion B1 and the gas phase method silica having an average primary particle diameter of 0.03 nm employed in Dispersion B3 in a weight ratio of 4:1

Dispersion B7: same as Dispersion B1 except that silica particles were replaced with a mixture of the gas phase method silica having an average primary particle diameter of 0.007 nm employed in Dispersion B1 and the gas phase method silica having an average primary particle diameter of 0.03 nm employed in Dispersion B4 in a weight ratio of 1:1.

Further, the particle diameters of fine inorganic particles comprised in the void layer of each recording sheet were measured by employing an electron microscope and the results shown in Table 1 were obtained.

The 60-degree gloss of each recording sheet was measured by employing a gloss meter (VGS-1001DP) manufactured by Nihon Denshoku Kogyo Co.

Further, solid black printing was carried out employing the following three types of ink-jet printers, and the gloss of the resulting print was measured in the same manner as above:

(a): PM750C manufactured by Seiko Epson Co.

(b): EJC700J manufactured by Canon Co.

(c): Photo Smart manufactured by Hewlett-Packard Co.

Table 1 shows the results.

TABLE 1

| Recording Sheet | Fine Inorganic Particles: Average Particle Diameter | Fine Inorganic Particles: Dispersion Degree | Gloss of Nonimage Area | Gloss of Image Area (a) | Gloss of Image Area (b) | Gloss of Image Area (c) |
|---|---|---|---|---|---|---|
| 1 | 55 nm | 0.72 | 52% | 48% | 49% | 52% |
| 2 | 72 nm | 2.52 | 19% | 19% | 20% | 20% |
| 3 | 88 nm | 0.94 | 37% | 36% | 35% | 37% |
| 4 | 190 nm | 1.54 | 12% | 11% | 12% | 12% |
| 5 | 81 nm | 1.83 | 25% | 26% | 26% | 25% |
| 6 | 74 nm | 2.72 | 16% | 15% | 14% | 14% |
| 7 | 140 nm | 1.58 | 10% | 9% | 9% | 9% |

The gloss of Recording Sheet-1, -3, and -5, in which fine inorganic particles having a dispersion degree of no more than 2 as well as an average particle diameter of no more than 100 nm were employed, was relatively high, and the gloss of the solid-printed area was almost the same as the Recording Sheet.

Example 1

An emulsified dispersion was prepared in the same manner as Comparative Example 1, except that in Recording Sheet-1 through recording Sheet-7, ethyl acetate employed for preparing a dispersion comprising the fluorescent whitening agent employed in the first, second, and third layers was decreased to ⅔ and the saponin was decreased to ½.

The average particle diameter of particles in the fluorescent whitening agent dispersion prepared as described above was approximately 0.7 μm, and the ratio of particles having a particle diameter of at least 1.0 μm was approximately 15 percent. Recording Sheet-11 through Recording Sheet-17 were prepared in the same manner employing this fluorescent whitening agent dispersion. The gloss before and after printing was measured in the same manner as Comparative Example 1 and the results shown in Table 2 were obtained.

TABLE 2

| Recording Sheet | Fine Inorganic Particles: Average Particle Diameter | Fine Inorganic Particles: Dispersion Degree | Gloss of Nonimage Area | Gloss of Image Area (a) | Gloss of Image Area (b) | Gloss of Image Area (c) |
|---|---|---|---|---|---|---|
| 11 | 55 nm | 0.72 | 48% | 56% | 57% | 59% |
| 12 | 72 nm | 2.52 | 18% | 19% | 20% | 18% |
| 13 | 88 nm | 0.94 | 34% | 40% | 39% | 41% |
| 14 | 190 nm | 1.54 | 11% | 10% | 11% | 11% |
| 15 | 81 nm | 1.83 | 24% | 27% | 28% | 28% |
| 16 | 74 nm | 2.72 | 15% | 16% | 16% | 17% |
| 17 | 140 nm | 1.58 | 10% | 10% | 10% | 9% |

By employing the emulsified dispersion having particles with a large diameter, before printing, the gloss of Recording Sheet-11, -13, and -15 according to the present invention slightly decreased compared to Recording Sheet-1, -3, and -5 prepared in Comparative Example 1, while after printing those employing an ink-jet printer, on the contrary, the gloss increased, and the printed part exhibited an increase in clearness and brightness.

Contrary to this, Recording Sheet-1, -4, and -17, in which fine inorganic particle having a diameter exceeding 100 nm were employed, and Recording Sheet-12, and -16, in which fine inorganic particles having a dispersion degree exceeding 2 were employed, exhibited low gloss. Almost no increase in gloss due to ink-jet printing resulted and the clearness of a overall print was low.

Example 2

In Recording Sheet-1 through Recording Sheet-7, a coating composition was prepared by adding 25 ml of cationic latex particles (having an average particle diameter of 0.75 μm and in which particles having a diameter of at least 1.0 μm shares approximately 20 percent) per liter of the coating composition, and Recording Sheet-21 through Recording Sheet 27 were prepared in the same manner as Comparative Example 1 employing Dispersions B1 through B7.

Evaluation was carried out in the same manner as Example 1 and the results shown in Table 3 were obtained.

TABLE 3

| Recording Sheet | Fine Inorganic Particles Average Particle Diameter | Fine Inorganic Particles Dispersion Degree | Gloss of Nonimage Area | Gloss of Image Area (a) | (b) | (c) |
|---|---|---|---|---|---|---|
| 21 | 55 nm | 0.72 | 47% | 54% | 55% | 54% |
| 22 | 72 nm | 2.52 | 17% | 18% | 19% | 17% |
| 23 | 88 nm | 0.94 | 33% | 39% | 38% | 38% |
| 24 | 190 nm | 1.54 | 11% | 10% | 10% | 10% |
| 25 | 81 nm | 1.83 | 23% | 26% | 26% | 27% |
| 26 | 74 nm | 2.72 | 15% | 15% | 16% | 15% |
| 27 | 140 nm | 1.58 | 10% | 9% | 10% | 9% |

By adding, before printing, latex particles having a relatively large particle diameter in the same manner as Example 1, the gloss of Recording Sheet-21, -23, and -25 of the present invention decreased somewhat, but after printing, on the contrary, the gloss increased and markedly clear prints were obtained from these Recording Sheets.

Example 3

Recording Sheet-31 through Recording Sheet-37 were prepared in the same manner as Comparative Example 1, except that in Recording Sheet-1 through Recording Sheet-7, titanium oxide having an average particle diameter of 0.30 $\mu$m was added so as to obtain 0.4 g per $m^2$ of the Recording Sheet.

The gloss before and after printing was measured in the same manner as Comparative Example 1, and the results shown in Table 4 were obtained.

TABLE 4

| Recording Sheet | Fine Inorganic Particles Average Particle Diameter | Fine Inorganic Particles Dispersion Degree | Gloss of Nonimage Area | Gloss of Image Area (a) | (b) | (c) |
|---|---|---|---|---|---|---|
| 31 | 55 nm | 0.72 | 46% | 59% | 58% | 60% |
| 32 | 72 nm | 2.52 | 17% | 18% | 19% | 18% |
| 33 | 88 nm | 0.94 | 33% | 44% | 45% | 43% |
| 34 | 190 nm | 1.54 | 11% | 11% | 12% | 11% |
| 35 | 81 nm | 1.83 | 23% | 29% | 30% | 31% |
| 36 | 74 nm | 2.72 | 14% | 14% | 13% | 14% |
| 37 | 140 nm | 1.58 | 9% | 9% | 10% | 10% |

The same effects as for Examples 1 and 2 were obtained by the addition of titanium oxide having high refractive index to the first layer.

Example 4

In Recording Sheet-1 through Recording Sheet-7, before coating the first to fourth layer, gelatin was previously coated so as to obtain 2.0 g per $m^2$ of the Recording Sheet. This gelatin layer was hardened by adding 20 mg of 2,4-dichloro6-hydroxy-s-triazine sodium salt per g of gelatin. Recording Sheet-41 through Recording Sheet-47 were prepared by coating the above-mentioned first to fourth layer onto the resulting gelatin layer.

The gloss before and after printing was measured in the same manner as Comparative Example 1, and the results shown in Table 5 were obtained.

TABLE 5

| Recording Sheet | Fine Inorganic Particles Average Particle Diameter | Fine Inorganic Particles Dispersion Degree | Gloss of Nonimage Area | Gloss of Image Area (a) | (b) | (c) |
|---|---|---|---|---|---|---|
| 41 | 55 nm | 0.72 | 43% | 50% | 49% | 49% |
| 42 | 72 nm | 2.52 | 15% | 16% | 16% | 17% |
| 43 | 88 nm | 0.94 | 30% | 39% | 37% | 40% |
| 44 | 190 nm | 1.54 | 10% | 10% | 11% | 11% |
| 45 | 81 nm | 1.83 | 22% | 27% | 26% | 28% |
| 46 | 74 nm | 2.72 | 12% | 12% | 13% | 13% |
| 47 | 140 nm | 1.58 | 9% | 9% | 9% | 9% |

While Recording Sheet-41, -43, and -45 were exhibiting relatively high gloss, the gloss further increased and clearer prints were obtained compared to those obtained in Comparative Example 1.

According to the present invention, it is possible to provide an ink-jet recording sheet which exhibits relatively high gloss and yields a high-quality print due to a further increase in gloss when printed by employing ink-jet.

What is claimed is:

1. An ink-jet recording sheet comprising a support having thereon an ink-absorbable layer which is composed of at least two void layers containing inorganic particles having a dispersion degree of no more than 2 and a hydrophilic binder, wherein at least one void layer, except for the uppermost void layer, of the void layers has organic compound particles having a relatively large particle diameter and the ink-jet recording sheet has a specular gloss specified by JIS Z8741, of at least 20 percent at 60 degrees of the surface of said ink absorbable layer, and exhibits the specular gloss such that 60-degree specular gloss of an ink-recorded part is 3 percent more than that of a nonink-recorded part.

2. An ink-jet recording sheet comprising a support having thereon an ink-absorbable layer which is composed of at least two void layers containing inorganic particles having a dispersion degree of no more than 2, polyvinyl alcohol and a hardener, wherein at least one void layer, except for the uppermost void layer, of the void layers has organic compound particles having a relatively large particle diameter and the ink-jet recording sheet has a specular gloss of at least 20 percent at 60 degrees of the surface of said ink absorbable layer, and exhibits the specular gloss such that 60-degree specular gloss of an ink-recorded part is 3 percent not less than that of a nonink-recorded part.

3. An ink-jet recording sheet of claim 2 wherein the support is water-resistant.

4. An ink-jet recording sheet of claim 2 wherein the inorganic particles are silica having an average particle diameter of no more than 100 nm.

5. An ink-jet recording sheet of claim 2 wherein the void layer contains a hardener.

6. An ink-jet recording sheet of claim 5 wherein the hardener is boric acids or salts thereof.

7. An ink-jet recording sheet of claim 2 wherein the support has a specular gloss of 20 to 80 percent.

8. An ink-jet recording sheet of claim 3 wherein the support is translucent polyester film, opaque polyolefin resin film or paper laminated with polyethylene on both surfaces of a paper substrate.

9. An ink-jet recording sheet of claim 8 wherein the support is paper laminated with polyethylene on both surfaces of a paper substrate.

10. An ink-jet recording sheet of claim 1 wherein the ink-jet recording sheet exhibits the specular gloss such that 60-degree specular gloss of an ink-recorded part is 3 to 20 percent more than that of a nonink-recorded part.

11. An ink-jet recording sheet of claim 10 wherein the ink-jet recording sheet exhibits the specular gloss such that 60-degree specular gloss of an ink-recorded part is 5 to 15 percent more than that of a nonink-recorded part.

12. An ink-jet recording sheet of claim 1 wherein the hydrophilic binder is polyvinyl alcohol.

13. The ink-jet recording sheet of claim 2 wherein the inorganic particles have an average diameter of no more than 100 nm.

14. The ink jet recording sheet of claim 13 wherein the support is water-resistant.

15. The ink-jet recording sheet of claim 13 wherein the hardener is boric acids or salts thereof.

16. The ink-jet recording sheet of claim 13 wherein the support has a specular gloss of 20 to 80 percent.

17. The ink-jet recording sheet of claim 13 comprising the inorganic particles in an amount of 3 to 50 g per 1 $m^2$ of the sheet.

18. The ink-jet recording sheet of claim 17 comprising the polyvinyl alcohol in an amount of 0.5 to 10 g per 1 $m^2$ of the sheet.

19. The ink-jet recording sheet of claim 13 wherein the ink-jet recording sheet exhibits the specular gloss such that 60-degree specular gloss of an ink-recorded part is 5 to 15 percent more than that of a nonink-recorded part.

20. An ink-jet recording sheet of claim 1 wherein the support is water-resistant, the hardener is boric acids or salts thereof, and the inorganic particles are silica.

21. The ink-jet recording sheet of claim 1, wherein the relatively large particle diameter is 1.0 $\mu$m to 5.0 $\mu$m.

22. The ink-jet recording sheet of claim 2, wherein the relatively large particle diameter is 1.0 $\mu$m to 5.0 $\mu$m.

* * * * *